United States Patent
Liu

(10) Patent No.: US 11,229,008 B2
(45) Date of Patent: Jan. 18, 2022

(54) PAGING CONFIGURATION METHOD AND DEVICE, PAGING MESSAGE RECEIVING METHOD AND DEVICE, AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/643,884

(22) PCT Filed: Sep. 8, 2017

(86) PCT No.: PCT/CN2017/101084
§ 371 (c)(1),
(2) Date: Mar. 3, 2020

(87) PCT Pub. No.: WO2019/047168
PCT Pub. Date: Mar. 14, 2019

(65) Prior Publication Data
US 2020/0275407 A1    Aug. 27, 2020

(51) Int. Cl.
*H04W 68/00* (2009.01)
*H04W 68/02* (2009.01)

(52) U.S. Cl.
CPC ......... *H04W 68/02* (2013.01); *H04W 68/005* (2013.01)

(58) Field of Classification Search
CPC .............................. H04W 68/02; H04W 68/005
See application file for complete search history.

(56) References Cited

U.S. PATENT DOCUMENTS

| | | | |
|---|---|---|---|
| 9,706,521 B1 | 7/2017 | Oroskar et al. | |
| 2009/0275368 A1* | 11/2009 | Wang | H04W 28/08 455/574 |
| 2013/0303203 A1* | 11/2013 | Wang | H04W 68/00 455/458 |
| 2016/0007170 A1 | 1/2016 | Vaidya et al. | |
| 2016/0007316 A1 | 1/2016 | Vaidya et al. | |
| 2016/0286385 A1* | 9/2016 | Ryu | H04W 76/28 |

(Continued)

FOREIGN PATENT DOCUMENTS

| | | |
|---|---|---|
| CN | 104350795 A | 2/2015 |
| CN | 107079404 A | 8/2017 |

OTHER PUBLICATIONS

Xiaomi Technology. "3GPP TSG RAN WG1 Meeting #90, R1-1714263" Discussion on Paging in NR, Aug. 25, 2017 (Aug. 25, 2017), chapters 2.1 and 2.2.

(Continued)

*Primary Examiner* — Erika A Washington
(74) *Attorney, Agent, or Firm* — Syncoda LLC; Feng Ma

(57) ABSTRACT

A paging configuration method includes: judging whether a present system load level of a present cell is greater than a preset load threshold or not; and when the present system load level is lower than or equal to the preset load threshold, sending first configuration information to each UE in the present cell, the first configuration information including multiple Paging Occasions (POs), a first effective PO set in the multiple POs, an identifier of UE and an identifier of an effective PO corresponding to the UE in the first effective PO set.

19 Claims, 17 Drawing Sheets

(56) References Cited

U.S. PATENT DOCUMENTS

| | | | |
|---|---|---|---|
| 2017/0273078 A1* | 9/2017 | Rico Alvarino | H04W 68/00 |
| 2017/0367069 A1* | 12/2017 | Agiwal | H04W 68/025 |
| 2018/0092062 A1* | 3/2018 | Chen | H04W 68/00 |
| 2018/0288666 A1* | 10/2018 | Fujishiro | H04W 68/00 |
| 2020/0092846 A1* | 3/2020 | Deng | H04B 7/0695 |

OTHER PUBLICATIONS

International Search Report in the international application No. PCT/CN2017/101084, dated May 30, 2018.
English translation of the Written Opinion of the International Search Authority in the international application No. PCT/CN2017/101084, dated May 30, 2018.
3GPP TR 38.811v0.1.0 (Jun. 2017); 3rd Generation Partnership Project; Technical Specification Group Radio Access Network; Study on New Radio (NR) to support Non Terrestrial Networks(Release 15).
First Office Action of the Chinese application No. 201780001550.7, dated Sep. 10, 2020.

* cited by examiner

US 11,229,008 B2

PAGING CONFIGURATION METHOD AND DEVICE, PAGING MESSAGE RECEIVING METHOD AND DEVICE, AND BASE STATION

CROSS-REFERENCE TO RELATED APPLICATIONS

This application is a national stage of International Application No. PCT/CN2017/101084 filed on Sep. 8, 2017, the disclosure of which is hereby incorporated by reference in its entirety.

TECHNICAL FIELD

The present disclosure generally relates to the technical field of communication, and more particularly, to a method and device for paging configuration, a method and device for receiving a paging message, a base station, User Equipment (UE) and a computer-readable storage medium.

BACKGROUND

Along with rapid development of wireless communication technologies, 5th Generation (5G) systems have emerged. A 5G system is often applicable to a high band, i.e., a band above 6 GHz. In a high band, due to a poor propagation characteristic of a radio wave, conventional omnidirectional transmission cannot be applicable anymore, and beam scanning and beam management are needed to be introduced for communication.

A Synchronous Signal Block (SSB), as a basis for downlink beam measurement in an initial access process, generally includes a beam index, and thus UE may report a beam according to the index.

Different types of UE may exist in a 5G system. An important type is low-delay UE, and the UE of this type generally has a high requirement on delay and is not so power-consuming. A main function of paging is to notify a connection request from UE in an idle state and notify a change of a system message to UE in an idle or connected state. However, a base station, when sending a paging message to UE in an idle state, does not know a position of the UE and thus can send the paging message only by scanning all beams. The unit of a Paging Occasion (PO) in a Long-Term Evolution (LTE) system is 1 ms, while the unit of a PO in 5G is multiple time slots and a specific numerical value has yet not been determined at present.

It can be seen from an SSB configuration that, in a 5G system, an SSB is only concentrated in a 5 ms window within 20 ms and thus different circumstances may exist for the number of POs in the 20 ms, namely some POs are close to the SSB and some POs are relatively far from the SSB. Accordingly, a problem of paging configuration may be brought.

SUMMARY

In view of this, the present disclosure provides a paging configuration method and device, a method and device for receiving a paging message, a base station, UE and a computer-readable storage medium, to solve the paging configuration problem brought by unbalanced SSB distribution and reduce a paging overhead.

According to a first aspect of embodiments of the present disclosure, a paging configuration method is provided, which may be applied to a base station and include that:

whether a present system load level of a present cell is greater than a preset load threshold or not is judged; and in response to determining the present system load level is lower than or equal to the preset load threshold, first configuration information is sent to each UE in the present cell, the first configuration information including multiple POs, a first effective PO set in the multiple POs, an identifier (ID) of UE and an ID of an effective PO corresponding to the UE in the first effective PO set.

In an embodiment, the method may further include that:

in response to determining the present system load level is greater than the preset load threshold, second configuration information is sent to each UE in the present cell through a system information updating message, the second configuration information including the multiple POs, a second effective PO set in the multiple POs, the ID of the UE and an ID of an effective PO corresponding to the UE in the second effective PO set, and the first effective PO set being a subset of the second effective PO set; or in response to determining the present system load level is greater than the preset load threshold, third configuration information is sent to newly-added UE in the present cell through Radio Resource Control (RRC) signaling, the third configuration information including the multiple POs, the first effective PO set and offset information.

In an embodiment, the system information updating message may include a newly-added field, and the newly-added field may be configured to represent the ID of the UE and the ID of the effective PO corresponding to the UE in the second effective PO set.

In an embodiment, the second configuration information may further include a synchronous reference signal corresponding to each effective PO in a difference set between the second effective PO set and the first effective PO set.

In an embodiment, the method may further include that:

UE related information is received from the UE, the UE related information including at least one of type information, capability information and a service request of the UE; and the UE is grouped according to the UE related information.

In an embodiment, the operation that the second configuration information is sent to each UE in the present cell through the system information updating message may include that:

an effective PO in the first effective PO set is sent to UE belonging to a first group in the present cell through a system information updating message; and an effective PO in a difference set between the second effective PO set and the first effective PO set is sent to UE belonging to a second group in the present cell through a system information updating message.

According to a second aspect of the embodiments of the present disclosure, a method for receiving a paging message is provided, which may be applied to UE and include that:

configuration information is received from a base station, the configuration information including multiple POs, an effective PO set in the multiple POs and related information for determining an effective PO corresponding to the UE;

the effective PO is determined according to the configuration information; and a paging message is received through the effective PO.

In an embodiment, when the configuration information is first configuration information, the effective set in the multiple POs may be a first effective PO set, and the related information for determining the effective PO corresponding to the UE may be an ID of UE and an ID of an effective PO corresponding to the UE in the first effective PO set;

when the configuration information is second configuration information, the effective set in the multiple POs may be a second effective PO set, and the related information for determining the effective PO corresponding to the UE may be the ID of the UE and an ID of an effective PO corresponding to the UE in the second effective PO set; and when the configuration information is third configuration information, the effective set in the multiple POs may be the first effective PO set, and the related information for determining the effective PO corresponding to the UE may be offset information.

In an embodiment, the second configuration information may be contained in a system information updating message.

In an embodiment, the second configuration information may further include a synchronous reference signal corresponding to each effective PO in a difference set between the second effective PO set and the first effective PO set; and the method may further include that: before the effective PO is determined according to the configuration information, downlink synchronization is performed according to the synchronous reference signal.

In an embodiment, the third configuration information may be contained in RRC signaling.

In an embodiment, the method may further include that:

UE related information is reported to the base station to enable the base station to group the UE according to the UE related information, the UE related information including at least one of type information, capability information and a service request of the UE.

According to a third aspect of the embodiments of the present disclosure, a paging configuration device is provided, which may be applied to a base station and include:

a judgment module, configured to judge whether a present system load level of a present cell is greater than a preset load threshold or not; and a first sending module, configured to, when the judgment module determines that the present system load level is lower than or equal to the preset load threshold, send first configuration information to each UE in the present cell, the first configuration information including multiple POs, a first effective PO set in the multiple POs, an ID of UE and an ID of an effective PO corresponding to the UE in the first effective PO set.

In an embodiment, the device may further include:

a second sending module, configured to, when the judgment module determines that the present system load level is greater than the preset load threshold, send second configuration information to each UE in the present cell through a system information updating message, the second configuration information including the multiple POs, a second effective PO set in the multiple POs, the ID of the UE and an ID of an effective PO corresponding to the UE in the second effective PO set, and the first effective PO set being a subset of the second effective PO set; or a third sending module, configured to, when the judgment module determines that the present system load level is greater than the preset load threshold, send third configuration information to newly-added UE in the present cell through RRC signaling, the third configuration information including the multiple POs, the first effective PO set and offset information.

In an embodiment, the system information updating message may include a newly-added field, and the newly-added field may be configured to represent the ID of the UE and the ID of the effective PO corresponding to the UE in the second effective PO set.

In an embodiment, the second configuration information may further include a synchronous reference signal corresponding to each effective PO in a difference set between the second effective PO set and the first effective PO set.

In an embodiment, the device may further include:

a receiving module, configured to receive UE related information from the UE, the UE related information including at least one of type information, capability information and a service request of the UE; and a grouping module, configured to group the UE according to the UE related information received by the receiving module.

In an embodiment, the second sending module may include:

a first sending submodule, configured to send an effective PO in the first effective PO set to UE belonging to a first group in the present cell through a system information updating message; and a second sending submodule, configured to send an effective PO in a difference set between the second effective PO set and the first effective PO set to UE belonging to a second group in the present cell through a system information updating message.

According to a fourth aspect of the embodiments of the present disclosure, a device for receiving a paging message is provided, which may be applied to UE and include:

a first receiving module, configured to receive configuration information from a base station, the configuration information including multiple POs, an effective PO set in the multiple POs and related information for determining an effective PO corresponding to the UE;

a determination module, configured to determine the effective PO according to the configuration information received by the first receiving module; and a second receiving module, configured to receive a paging message through the effective PO determined by the determination module.

In an embodiment, when the configuration information is first configuration information, the effective set in the multiple POs may be a first effective PO set, and the related information for determining the effective PO corresponding to the UE may be an ID of UE and an ID of an effective PO corresponding to the UE in the first effective PO set;

when the configuration information is second configuration information, the effective set in the multiple POs may be a second effective PO set, and the related information for determining the effective PO corresponding to the UE may be the ID of the UE and an ID of an effective PO corresponding to the UE in the second effective PO set; and when the configuration information is third configuration information, the effective set in the multiple POs may be the first effective PO set, and the related information for determining the effective PO corresponding to the UE may be offset information.

In an embodiment, the second configuration information may be contained in a system information updating message.

In an embodiment, the second configuration information may further include a synchronous reference signal corresponding to each effective PO in a difference set between the second effective PO set and the first effective PO set; and the device may further include a synchronization module, configured to, before the determination module determines the effective PO according to the configuration information, perform downlink synchronization according to the synchronous reference signal.

In an embodiment, the third configuration information may be contained in RRC signaling.

In an embodiment, the device may further include:

a reporting module, configured to report UE related information to the base station to enable the base station to group the UE according to the UE related information, the UE related information including at least one of type information, capability information and a service request of the UE.

According to a fifth aspect of the embodiments of the present disclosure, a base station is provided, which may include:

a processor; and a memory configured to store an instruction executable by the processor, wherein the processor may be configured to:

judge whether a present system load level of a present cell is greater than a preset load threshold or not; and in response to determining the present system load level is lower than or equal to the preset load threshold, send first configuration information to each UE in the present cell, the first configuration information including multiple POs, a first effective PO set in the multiple POs, an ID of UE and an ID of an effective PO corresponding to the UE in the first effective PO set.

According to a sixth aspect of the embodiments of the present disclosure, UE is provided, which may include:

a processor; and a memory configured to store an instruction executable by the processor, wherein the processor may be configured to:

receive configuration information from a base station, the configuration information including multiple POs, an effective PO set in the multiple POs and related information for determining an effective PO corresponding to the UE;

determine the effective PO according to the configuration information; and receive a paging message through the effective PO.

According to a seventh aspect of the embodiments of the present disclosure, a computer-readable storage medium is provided, which has a computer program stored thereon for execution by a processor to implement the steps of the paging configuration method.

According to an eighth aspect of the embodiments of the present disclosure, a computer-readable storage medium is provided, which has a computer program stored thereon for execution by a processor to implement the steps of the method for receiving a paging message.

The technical solutions provided in the embodiments of the present disclosure may have the following beneficial effects.

When a present load level of a system is lower than or equal to a preset load threshold, first configuration information including multiple POs, a first effective PO set in the multiple POs, an ID of UE and an ID of an effective PO corresponding to the UE in the first effective PO set may be sent to each UE in the present cell, so that a paging configuration problem brought by unbalanced SSB distribution is solved, and a paging overhead is reduced.

Configuration information may be received, an effective PO may be determined according to the configuration information, and a paging message may be received through the effective PO. Since the effective PO configured for the UE in the configuration information is part of POs in the multiple POs, the paging overhead can be reduced, and power can also be saved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
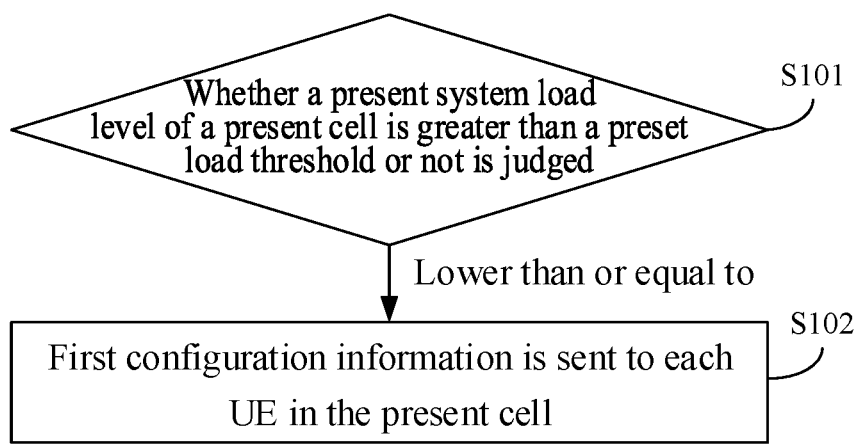
FIG. 1 is a flowchart showing a paging configuration method according to an exemplary embodiment of the present disclosure.

FIG. 1 is a flowchart showing a paging configuration method according to an exemplary embodiment of the present disclosure. The embodiment is described from a base station side. As shown in FIG. 1, the paging configuration method includes the following steps.

In step S101, whether a present system load level of a present cell is greater than a preset load threshold or not is judged.

Whether the present system load level of the present cell is greater than the preset load threshold or not may be judged in multiple manners. For example, whether the present system load level is greater than the preset load threshold or not may be judged by determining whether the present number of UE in the present cell is greater than a preset number or not.

In step S102, in response to determining the present system load level is lower than or equal to the preset load threshold, first configuration information is sent to each UE in the present cell, the first configuration information including multiple POs, a first effective PO set in the multiple POs, an identifier (ID) of UE and an ID of an effective PO corresponding to the UE in the first effective PO set.

The first effective PO set may refer to one or more POs close to an SSB.

In the embodiment, a base station may configure multiple POs for the UE. However, for reducing a paging overhead, not all the multiple POs are effective, and the base station may configure one or more POs close to the SSB as effective POs and configure the POs relatively far from the SSB to be ineffective because synchronous reference signals are needed to be configured for the POs relatively far from the SSB.

For facilitating paging message reception of the UE, the first configuration information may further include an ID of UE and an ID of an effective PO corresponding to the UE in the first effective PO set.

There is made such a hypothesis that the number of the UEs in the present cell is 20, the number of UEs corresponding to the preset load threshold is 100, the PO relatively close to the SSB is PO0 and the PO relatively far from the SSB is PO1. Since the present system load level is lower than the preset load threshold, the base station may send first configuration information including PO0 to the 20 UEs.

According to the embodiment, in response to determining the present system load level is lower than or equal to the preset load threshold, the first configuration information including the multiple POs, the first effective PO set in the multiple POs, the ID of the UE and the ID of the effective PO corresponding to the UE in the first effective PO set may be sent to each UE in the present cell, so that a paging configuration problem brought by unbalanced SSB distribution is solved, and the paging overhead is reduced.

Figure 2A:
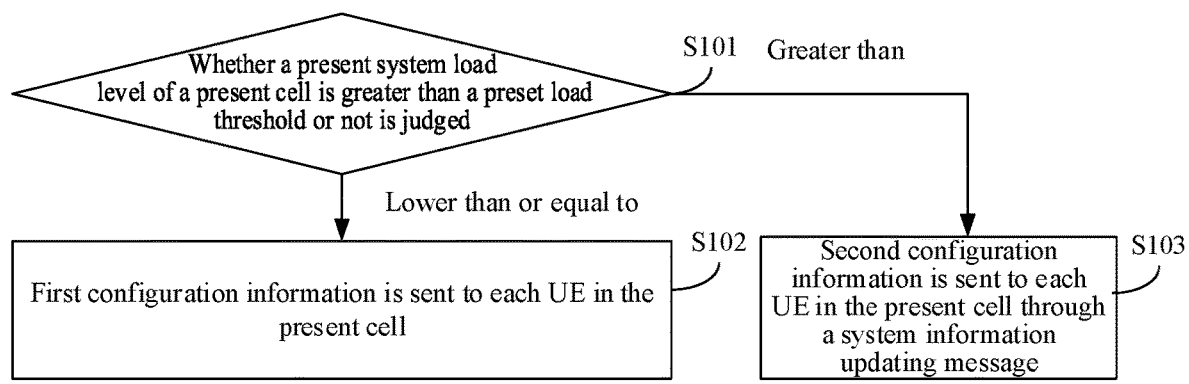
FIG. 2A is a flowchart showing another paging configuration method according to an exemplary embodiment of the present disclosure.

FIG. 2A is a flowchart showing another paging configuration method according to an exemplary embodiment of the present disclosure. As shown in FIG. 2A, the paging configuration method may further include the following step.

In step S103, in response to determining the present system load level is greater than the preset load threshold, second configuration information is sent to each UE in the present cell through a system information updating message, the second configuration information including the multiple POs, a second effective PO set in the multiple POs, the ID of the UE and an ID of an effective PO corresponding to the UE in the second effective PO set, and the first effective PO set being a subset of the second effective PO set.

The second effective PO set may include the first effective PO set and newly enabled POs, i.e., one or more POs relatively far from the SSB.

In the embodiment, in response to determining the present system load level is greater than the preset load threshold, the base station may enable new POs, i.e., the one or more POs relatively far from the SSB, to reduce a paging delay, and then may send the second configuration information to each UE in the present cell through the system information updating message.

The system information updating message may include a newly-added field, and the newly-added field may be configured to represent the ID of the UE and the ID of the effective PO corresponding to the UE in the second effective PO set.

Since the second configuration information includes the newly enabled POs, i.e., the one or more POs relatively far from the SSB, while synchronous reference signals are needed to be provided for the one or more POs relatively far from the SSB to facilitate downlink synchronization of the UE, the second configuration information may further include a synchronous reference signal corresponding to each effective PO in a difference set between the second effective PO set and the first effective PO set.

There is made such a hypothesis that the number of the UEs in the present cell is 120, the number of UEs corresponding to the preset load threshold is 100, the PO relatively close to the SSB is PO0 and the PO relatively far from the SSB is PO1. Since the present system load level is greater than the preset load threshold, the base station may send second configuration information to the 120 UEs. For example, the second configuration information including PO0 may be sent to 60 UEs and the second configuration information including PO1 may be sent to the other 60 UEs.

According to the embodiment, in response to determining the present system load level is greater than the preset load threshold, the second configuration information including the second effective PO set may be sent to each UE in the present cell through the system information updating message, so that more POs may be provided for the UE in the present cell, the paging overhead is reduced as much as possible, and meanwhile, the paging delay is reduced.

Figure 2B:
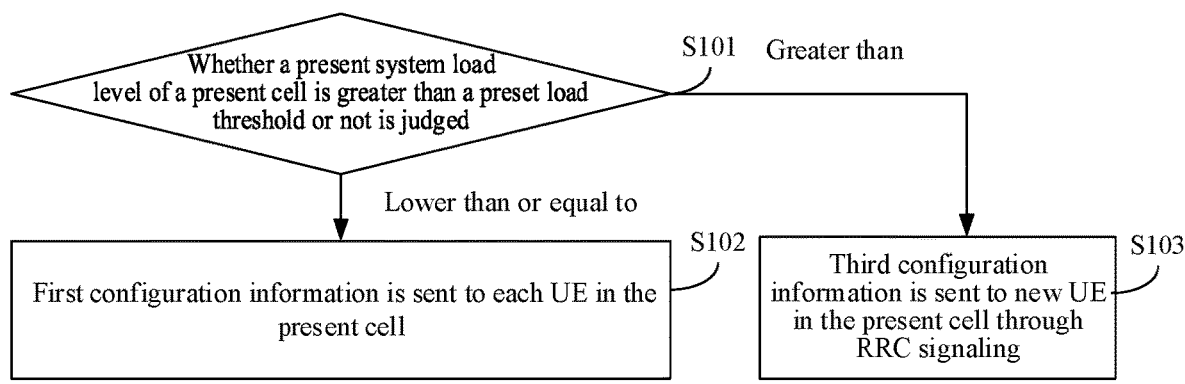
FIG. 2B is a flowchart showing another paging configuration method according to an exemplary embodiment of the present disclosure.

FIG. 2B is a flowchart showing another paging configuration method according to an exemplary embodiment of the present disclosure. As shown in FIG. 2B, the paging configuration method may further include the following step.

In step S104, in response to determining the present system load level is greater than the preset load threshold, third configuration information is sent to newly-added UE in the present cell through RRC signaling, the third configuration information including the multiple POs, the first effective PO set and offset information.

The offset information may be configured to determine an effective PO sent to the newly-added UE.

In the embodiment, in response to determining the present system load level is greater than the preset load threshold, the third configuration information may be sent to the newly-added UE. For example, when the number of UEs is 120 and the number of UEs corresponding to the preset load threshold is 100, third configuration information may be sent to the 20 newly-added UEs only. In such a manner, the amount of configuration information that is sent may be effectively reduced, so that transmission resource consumption is effectively reduced.

There is made such a hypothesis that the number of UEs in the present cell is 120, the number of UEs corresponding to the preset load threshold is 100, the PO relatively close to the SSB is PO0 and the PO relatively far from the SSB is PO1. Since the present system load level is greater than the preset load threshold, the base station may send third configuration information including the offset information 1 and the first effective PO set PO0 to the 20 newly-added UEs, and then the 20 newly-added UEs may calculate their own effective POs to be PO1 according to the offset information and the first effective PO set.

According to the embodiment, in response to determining the present system load level is greater than the preset load threshold, the third configuration information may be sent to the newly-added UE in the present cell through the RRC signaling, so that more POs may be provided for the UE in the present cell, the paging overhead is reduced as much as possible, meanwhile, the paging delay is reduced, and the transmission resource consumption may be effectively reduced.

Figure 2C:
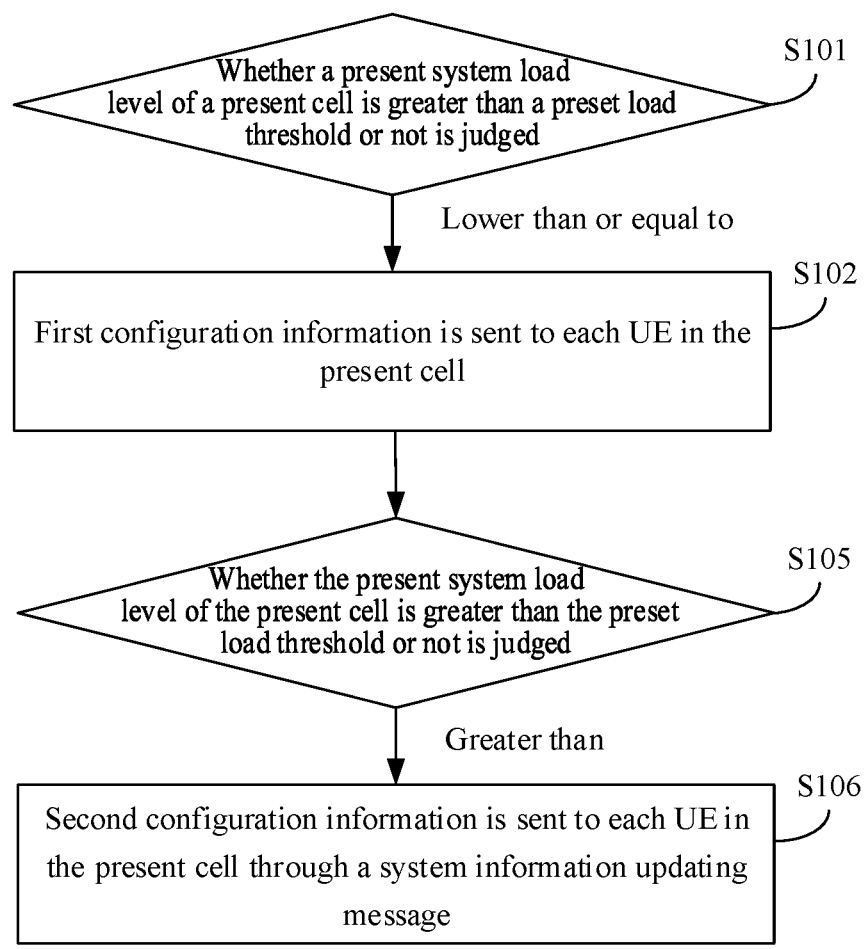
FIG. 2C is a flowchart showing another paging configuration method according to an exemplary embodiment of the present disclosure.

FIG. 2C is a flowchart showing another paging configuration method according to an exemplary embodiment of the present disclosure. As shown in FIG. 2, after S102, the paging configuration method may further include the following steps.

In step S105, whether the present system load level of the present cell is greater than the preset load threshold or not is judged.

In step S106, in response to determining the present system load level is greater than the preset load threshold, the second configuration information is sent to each UE in the present cell through the system information updating message, the second configuration information including the multiple POs, the second effective PO set in the multiple POs, the ID of the UE and the ID of the effective PO corresponding to the UE in the second effective PO set, and the first effective PO set being a subset of the second effective PO set.

There is made such a hypothesis that the number of UEs in the present cell is 20, the number of UEs corresponding to the preset load threshold is 100, the PO relatively close to the SSB is PO0 and the PO relatively far from the SSB is PO1. Since the present system load level is lower than the preset load threshold, the base station may send first configuration information including PO0 to the 20 UEs. Then, the number of the UEs in the present cell is 120. Since the present system load level is greater than the preset load threshold, the base station may send second configuration information to the 120 UEs. For example, the second configuration information including PO0 may be sent to 60 UEs and the second configuration information including PO1 may be sent to the other 60 UEs.

According to the embodiment, in response to determining the present system load level is lower than or equal to the preset load threshold, the first configuration information may be sent to each UE in the present cell; and in response to determining the present system load level is greater than the preset load threshold, the second configuration information may be sent to each UE in the present cell through the system information updating message, so that the paging overhead and the paging delay are reduced as much as possible.

Figure 3:
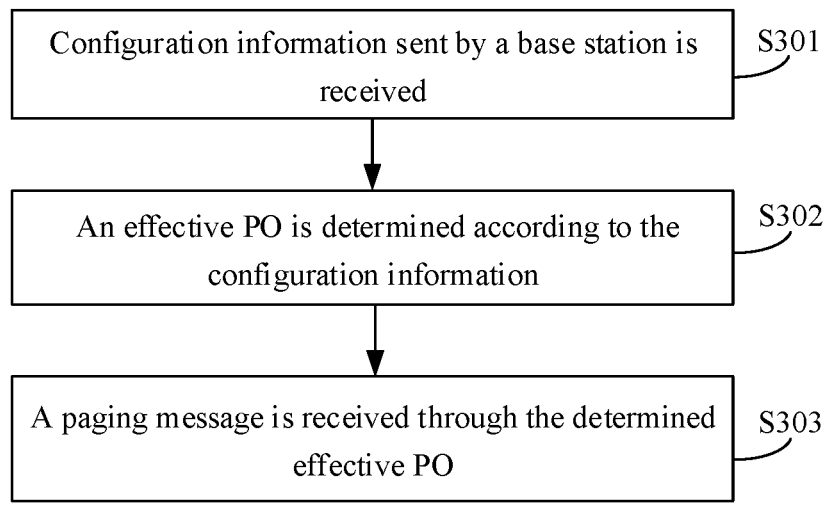
FIG. 3 is a flowchart showing a method for receiving a paging message according to an exemplary embodiment of the present disclosure.

FIG. 3 is a flowchart showing a method for receiving a paging message according to an exemplary embodiment of the present disclosure. The embodiment is described from a UE side. As shown in FIG. 3, the method for receiving a paging message includes the following steps.

In step S301, configuration information sent by a base station is received, the configuration information including multiple POs, at least one effective PO set in the multiple POs and related information for determining an effective PO corresponding to UE.

When the configuration information is first configuration information, an effective set in the multiple POs may be a first effective PO set, and the related information for determining the effective PO corresponding to the UE may be an ID of UE and an ID of an effective PO corresponding to the UE in the first effective PO set. When the configuration information is second configuration information, an effective set in the multiple POs may be a second effective PO set, and the related information for determining the effective PO corresponding to the UE may be the ID of the UE and an ID of an effective PO corresponding to the UE in the second effective PO set. When the configuration information is third configuration information, an effective set in the multiple POs may be the first effective PO set, and the related information for determining the effective PO corresponding to the UE may be offset information.

The second configuration information may be contained in a system information updating message, and the third configuration information may be contained in RRC signaling.

In step S302, the effective PO is determined according to the configuration information.

In the embodiment, when the configuration information includes the first configuration information, the ID of the effective PO corresponding to the UE may be determined according to the ID of the UE. When the configuration information includes the second configuration information, the ID of the effective PO corresponding to the UE may be determined according to the ID of the UE. When the configuration information includes the third configuration information, the offset information may be added to the effective PO ID in the first effective PO set to obtain the effective PO corresponding to the UE. For example, when the effective PO ID in the first effective PO set is 1 and the offset information is 2, the effective PO corresponding to the UE is PO3.

In step S303, a paging message is received through the determined effective PO.

After the corresponding effective PO is determined, the paging message may be received through the effective PO. According to the embodiment, the configuration information may be received, the effective PO may be determined according to the configuration information, and the paging message may be received through the effective PO. Since the effective PO configured for the UE in the configuration information is part of POs in the multiple POs, a paging overhead may be reduced, and power may also be saved.

Figure 4A:
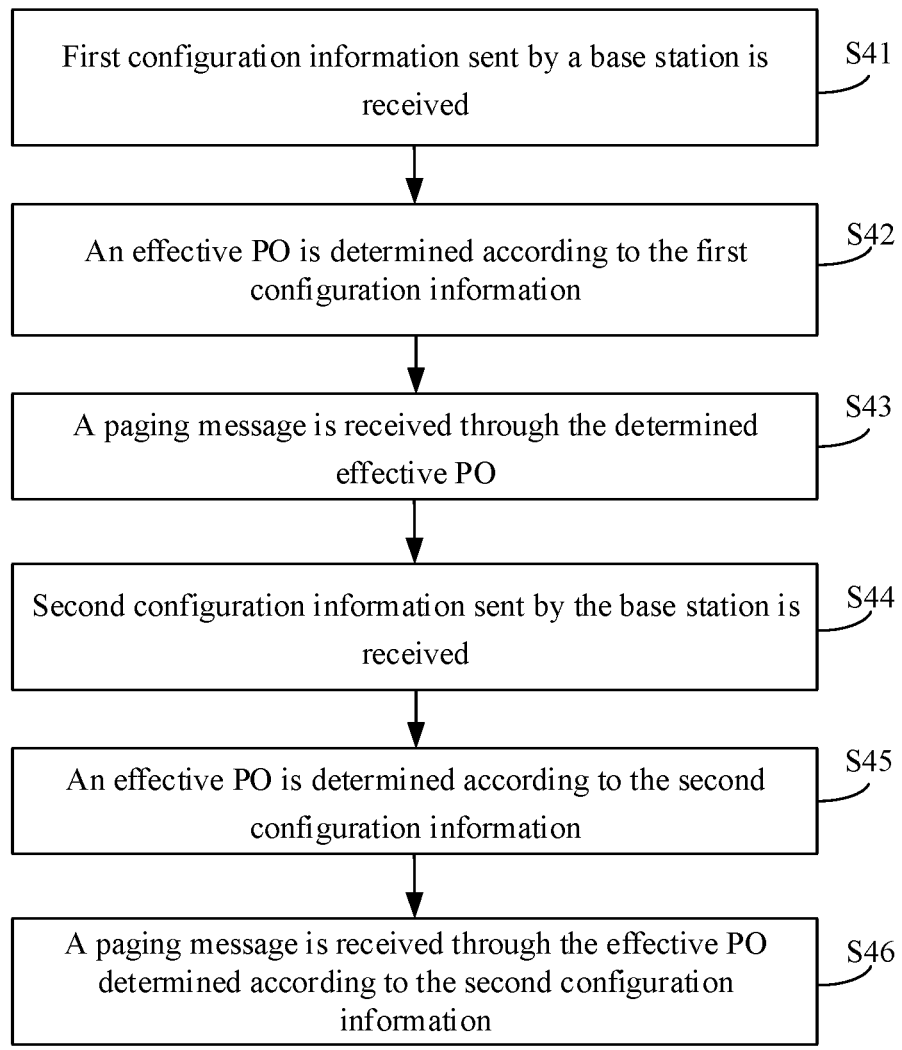
FIG. 4A is a flowchart showing another method for receiving a paging message according to an exemplary embodiment of the present disclosure.

FIG. 4A is a flowchart showing another method for receiving a paging message according to an exemplary embodiment of the present disclosure. As shown in FIG. 4A, the method for receiving a paging message may include the following steps.

In step S41, first configuration information sent by a base station is received.

In step S42, an effective PO is determined according to the first configuration information.

In step S43, a paging message is received through the determined effective PO.

In step S44, second configuration information sent by the base station is received.

In step S45, an effective PO is determined according to the second configuration information.

In step S46, a paging message is received through the effective PO determined according to the second configuration information.

In the embodiment, the base station may send the first configuration information to UE when a system load of a present cell is less than a preset load threshold, and the UE may determine the effective PO according to the first configuration information and receive the paging message through the effective PO. When the system load of the present cell is greater than the preset load threshold, the second configuration information may be sent to the UE, and the UE may determine the effective PO again according to the second configuration information and receive the paging message through the effective PO. It is to be noted that the effective PO determined according to the second configuration information and the effective PO determined according to the first configuration information may be the same or different.

According to the embodiment, the effective PO may be determined according to the first configuration information and the paging message may be received through the effective PO; and then, the effective PO may be determined again according to the second configuration information and the paging message may be received through the effective PO. Not only may a paging requirement of the UE be met, but also a paging delay of the UE in the present cell may be reduced as much as possible.

Figure 4B:
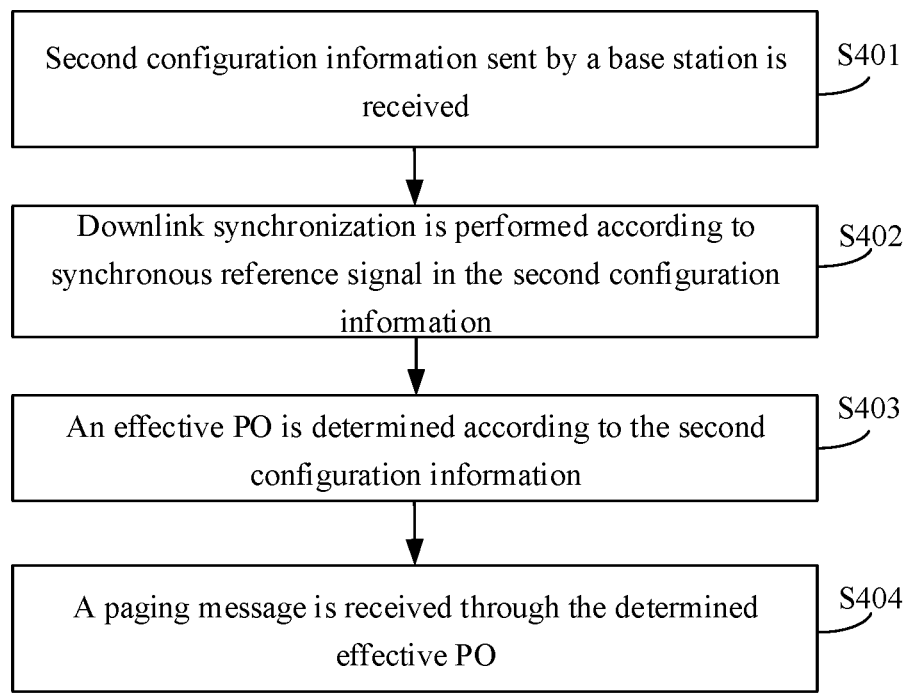
FIG. 4B is a flowchart showing another method for receiving a paging message according to an exemplary embodiment of the present disclosure.

FIG. 4B is a flowchart showing another method for receiving a paging message according to an exemplary embodiment of the present disclosure. As shown in FIG. 4B, the method for receiving a paging message may include the following steps.

In step S401, second configuration information sent by a base station is received, the second configuration information including multiple POs, a second effective PO set in the multiple POs, an ID of UE, an ID of an effective PO corresponding to the UE in the second effective PO set and a synchronous reference signal corresponding to each effective PO in a difference set between the second effective PO set and a first effective PO set.

When the first effective PO set is {PO0, PO1} and the second effective PO set is {PO0, PO1, PO2}, the second configuration information may include a synchronous reference signal corresponding to PO2.

In step S402, downlink synchronization is performed according to the synchronous reference signal in the second configuration information.

The UE may perform downlink synchronization according to the synchronous reference signal to correctly receive a paging message.

In step S403, an effective PO is determined according to the second configuration information.

In step S404, a paging message is received through the determined effective PO.

According to the embodiment, downlink synchronization may be performed according to the synchronous reference signal, and the paging message may be received through the determined effective PO, so that the paging message may be correctly received.

Figure 5:
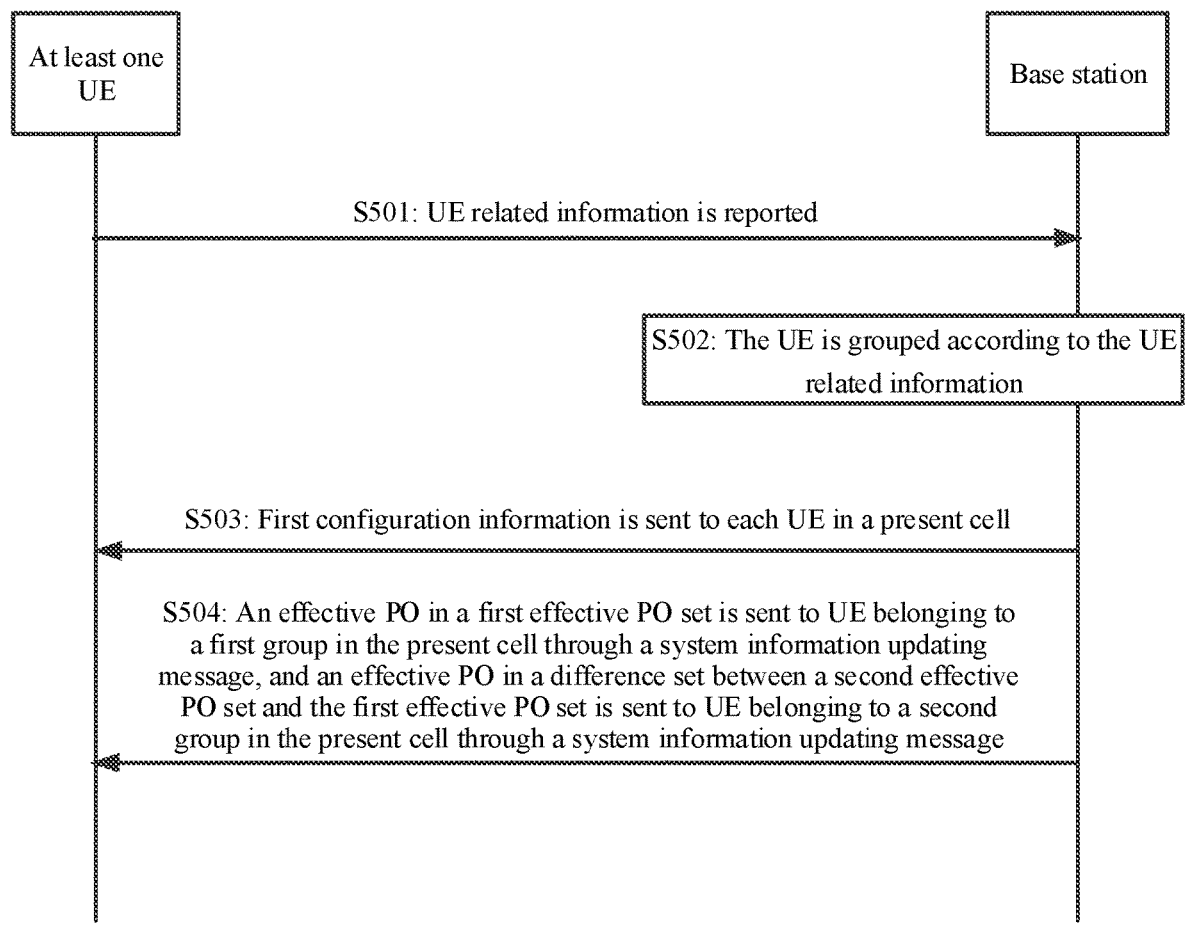
FIG. 5 is a signaling flowchart showing a method for receiving a paging message according to an exemplary embodiment of the present disclosure.

FIG. 5 is a signaling flowchart showing a method for receiving a paging message according to an exemplary embodiment of the present disclosure. The embodiment is described from the angle of interaction between a base station and UE. In the embodiment, the UE refers to at least one UE. As shown in FIG. 5, the method for receiving a paging message may include the following steps.

In step S501, the UE reports UE related information to the base station, and correspondingly, the base station receives the UE related information from the UE.

The UE related information may include, but not limited to, at least one of type information, capability information and a service request of the UE. The service request may include an Ultra Reliable Low Latency Communication (URLLC) service request and the like.

In step S502, the base station groups the UE according to the UE related information.

For example, low-delay UE may be divided into a first group, and non-low-delay UE may be divided into a second group.

The UE may be grouped to provide a condition for subsequently sending different effective POs to the UE of different groups according to grouping information.

In step S503, when the base station determines that a present system load level of a present cell is lower than or equal to a preset load threshold, first configuration information is sent to each UE in the present cell, the first configuration information including multiple POs, a first effective PO set in the multiple POs, an ID of UE and an ID of an effective PO corresponding to the UE in the first effective PO set.

In S504, when the base station determines that the present system load level of the present cell is greater than the preset load threshold, an effective PO in the first effective PO set is sent to UE belonging to a first group in the present cell through a system information updating message, and an effective PO in a difference set between a second effective PO set and the first effective PO set is sent to UE belonging to a second group in the present cell through a system information updating message.

Since the base station has grouped the UE, the base station, when sending second configuration information to each UE in the present cell, may send the effective PO in the first effective PO set to the UE belonging to the first group in the present cell and send the effective PO in the difference set between the second effective PO set and the first effective PO set to the UE belonging to the second group in the present cell. For example, a PO relatively close to an SSB may be sent to the low-delay UE, and a PO relatively far from the SSB may be sent to the non-low-delay UE. Therefore, power may be saved for the UE better, and a paging requirement of the low-delay UE may be met better.

According to the embodiment, the effective PO in the first effective PO set may be sent to the UE belonging to the first group in the present cell through the system information updating message, and the effective PO in the difference set between the second effective PO set and the first effective PO set may be sent to the UE belonging to the second group in the present cell through the system information updating message, so that power may be saved for the UE better, and a paging requirement of the UE may be met better.

Figure 6:
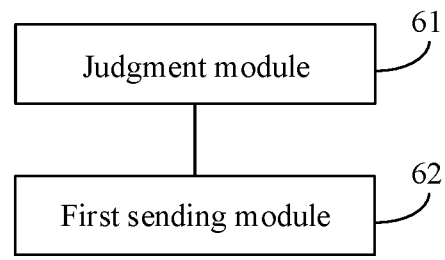
FIG. 6 is a block diagram of a paging configuration device according to an exemplary embodiment.

FIG. 6 is a block diagram of a paging configuration device according to an exemplary embodiment. The device may be arranged in a base station. As shown in FIG. 6, the device includes a judgment module 61 and a first sending module 62.

The judgment module 61 is configured to judge whether a present system load level of a present cell is greater than a preset load threshold or not.

Whether the present system load level of the present cell is greater than the preset load threshold or not may be determined in multiple manners. For example, whether the present system load level is greater than the preset load threshold or not may be judged by determining whether the present number of UE in the present cell is greater than a preset number or not.

The first sending module 62 is configured to, when the judgment module 61 determines that the present system load level is lower than or equal to the preset load threshold, send first configuration information to each UE in the present cell, the first configuration information including multiple POs, a first effective PO set in the multiple POs, an ID of UE and an ID of an effective PO corresponding to the UE in the first effective PO set.

The first effective PO set refers to one or more POs relatively close to an SSB.

In the embodiment, the base station may configure the multiple POs for the UE. However, for reducing a paging overhead, not all the multiple POs are effective. The base station may configure one or more POs relatively close to the SSB as effective POs and configure the POs relatively far from the SSB to be ineffective because synchronous reference signals are needed to be configured for the POs relatively far from the SSB.

For facilitating paging message reception of the UE, the first configuration information may further include an ID of UE and an ID of an effective PO corresponding to the UE in the first effective PO set.

There is made such a hypothesis that the number of the UEs in the present cell is 20, the number of UEs corresponding to the preset load threshold is 100, the PO relatively close to the SSB is PO0 and the PO relatively far from the SSB is PO1. Since the present system load level is lower than the preset load threshold, the base station may send first configuration information including PO0 to the 20 UEs.

According to the embodiment, in response to determining the present system load level is lower than or equal to the preset load threshold, the first configuration information including the multiple POs, the first effective PO set in the multiple POs, the ID of the UE and the ID of the effective PO corresponding to the UE in the first effective PO set may be sent to each UE in the present cell, so that a paging configuration problem brought by unbalanced SSB distribution is solved, and a paging overhead is reduced.

Figure 7:
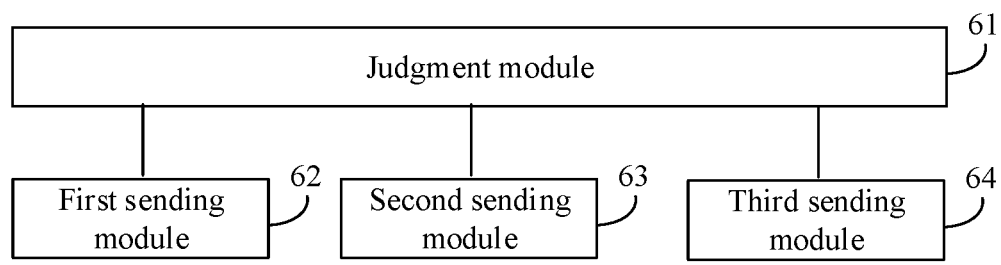
FIG. 7 is a block diagram of another paging configuration device according to an exemplary embodiment.

FIG. 7 is a block diagram of another paging configuration device according to an exemplary embodiment. As shown in FIG. 7, based on the embodiment shown in FIG. 6, the device may further include a second sending module 63 or a third sending module 64.

The second sending module 63 is configured to, when the judgment module 61 determines that the present system load level is greater than the preset load threshold, send second configuration information to each UE in the present cell through a system information updating message, the second configuration information including the multiple POs, a second effective PO set in the multiple POs, the ID of the UE and an ID of an effective PO corresponding to the UE in the second effective PO set, and the first effective PO set being a subset of the second effective PO set.

The second effective PO set may include the first effective PO set and newly enabled POs, i.e., one or more POs relatively far from the SSB.

In the embodiment, in response to determining the present system load level is greater than the preset load threshold, the base station may enable new POs, i.e., the one or more POs relatively far from the SSB, to reduce a paging delay, and then may send the second configuration information to each UE in the present cell through the system information updating message.

The system information updating message may include a newly-added field, and the newly-added field may be configured to represent the ID of the UE and the ID of the effective PO corresponding to the UE in the second effective PO set.

Since the second configuration information includes the newly enabled POs, i.e., the one or more POs relatively far from the SSB, while synchronous reference signals are needed to be provided for the one or more POs relatively far from the SSB to facilitate downlink synchronization of the UE, the second configuration information may further include a synchronous reference signal corresponding to each effective PO in a difference set between the second effective PO set and the first effective PO set.

There is made such a hypothesis that the number of the UE in the present cell is 120, the number of UEs corresponding to the preset load threshold is 100, the PO relatively close to the SSB is PO0 and the PO relatively far from the SSB is PO1. Since the present system load level is greater than the preset load threshold, the base station may send second configuration information to the 120 UEs. For example, the second configuration information including PO0 may be sent to 60 UEs and the second configuration information including PO1 may be sent to the other 60 UEs.

The third sending module 64 is configured to, when the judgment module 61 determines that the present system load level is greater than the preset load threshold, send third configuration information to newly-added UE in the present cell through RRC signaling, the third configuration information including the multiple POs, the first effective PO set and offset information.

The offset information is configured to determine an effective PO sent to the newly-added UE.

In the embodiment, in response to determining the present system load level is greater than the preset load threshold, the third configuration information may be sent to the newly-added UE. For example, when the number of the UEs in the present cell is 120 and the number of UEs corresponding to the preset load threshold is 100, third configuration information may be sent to the 20 newly-added UEs only. In such a manner, the amount of configuration information that is sent may be effectively reduced, so that transmission resource consumption is effectively reduced.

There is made such a hypothesis that the number of UEs in the present cell is 179, the number of UEs corresponding to the preset load threshold is 100, the PO relatively close to the SSB is PO0 and the PO relatively far from the SSB is PO1. Since the present system load level is greater than the preset load threshold, the base station may send third configuration information including the offset information 1 and the first effective PO set PO0 to the 20 newly-added UEs, and then the 20 newly-added UEs may calculate their own effective POs to be PO1 according to the offset information and the first effective PO set.

According to the embodiment, in response to determining the present system load level is greater than the preset load threshold, the second configuration information including the second effective PO set may be sent to each UE in the present cell through the system information updating message, so that more POs may be provided for the UE in the present cell, the paging overhead is reduced as much as possible, and meanwhile, the paging delay is reduced. In response to determining the present system load level is greater than the preset load threshold, the third configuration information may be sent to the newly-added UE in the present cell through the RRC signaling, so that more POs may be provided for the UE in the present cell, the paging overhead is reduced as much as possible, meanwhile, the paging delay is reduced, and the transmission resource consumption may be effectively reduced.

Figure 8A:
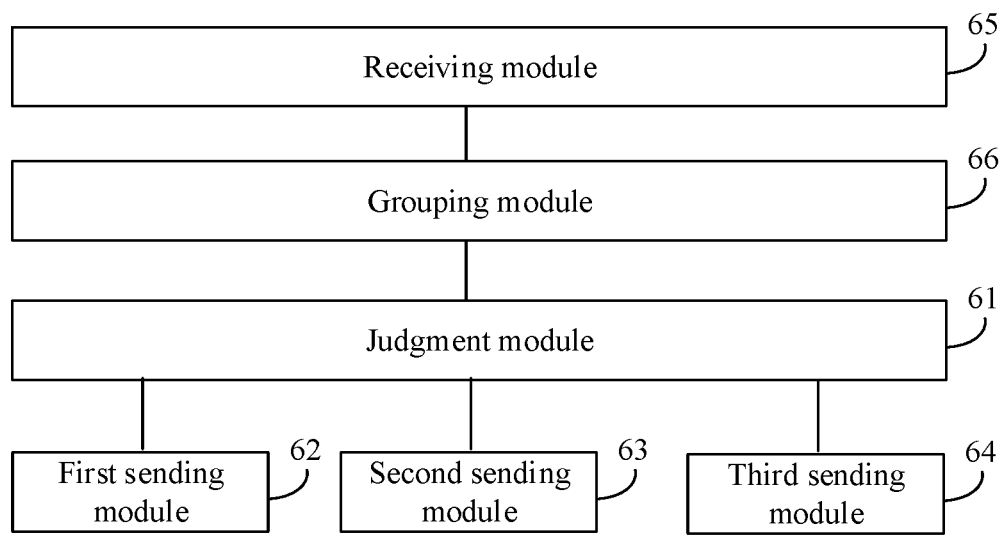
FIG. 8A is a block diagram of another paging configuration device according to an exemplary embodiment.

FIG. 8A is a block diagram of another paging configuration device according to an exemplary embodiment. As shown in FIG. 8A, based on the embodiment shown in FIG. 7, the device may further include a receiving module 65 and a grouping module 66.

The receiving module 65 is configured to receive UE related information from the UE, the UE related information including at least one of type information, capability information and a service request of the UE.

The service request may include a URLLC service request and the like.

The grouping module 66 is configured to group the UE according to the UE related information received by the receiving module 65.

For example, low-delay UE may be divided into a first group, and non-low-delay UE may be divided into a second group.

According to the embodiment, the UE may be grouped to provide a condition for subsequently sending different effective POs to the UE of different groups according to grouping information.

Figure 8B:
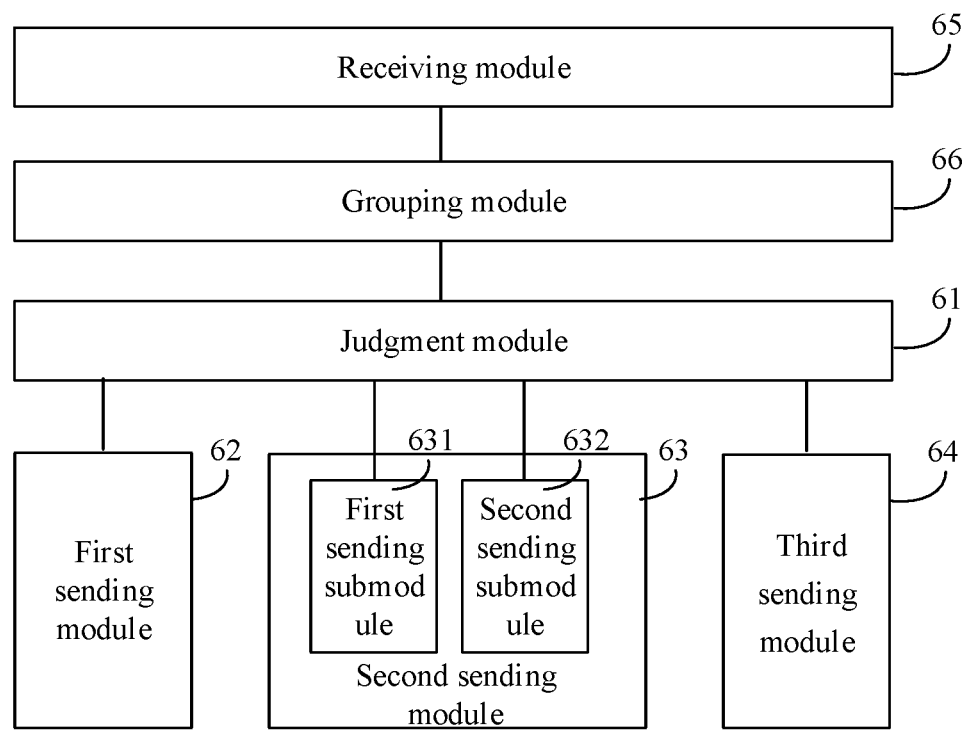
FIG. 8B is a block diagram of another paging configuration device according to an exemplary embodiment.

FIG. 8B is a block diagram of another paging configuration device according to an exemplary embodiment. As shown in FIG. 8B, based on the embodiment shown in FIG. 8A, the second sending module 63 may include a first sending submodule 631 and a second sending submodule 632.

The first sending submodule 631 is configured to send an effective PO in the first effective PO set to UE belonging to a first group in the present cell through a system information updating message.

The second sending submodule 632 is configured to send an effective PO in the difference set between the second effective PO set and the first effective PO set to UE belonging to a second group in the present cell through a system information updating message.

Since the base station has grouped the UE, the base station, when sending second configuration information to each UE in the present cell, may send the effective PO in the first effective PO set to the UE belonging to the first group in the present cell and send the effective PO in the difference set between the second effective PO set and the first effective PO set to the UE belonging to the second group in the present cell. For example, a PO relatively close to the SSB may be sent to the low-delay UE, and a PO relatively far from the SSB may be sent to the non-low-delay UE. Therefore, power may be saved for the UE better, and a paging requirement of the low-delay UE may be met better.

According to the embodiment, the effective PO in the first effective PO set may be sent to the UE belonging to the first group in the present cell through the system information updating message, and the effective PO in the difference set between the second effective PO set and the first effective PO set may be sent to the UE belonging to the second group in the present cell through the system information updating message, so that power may be saved for the UE better, and a paging requirement of the UE may be met better.

Figure 9:
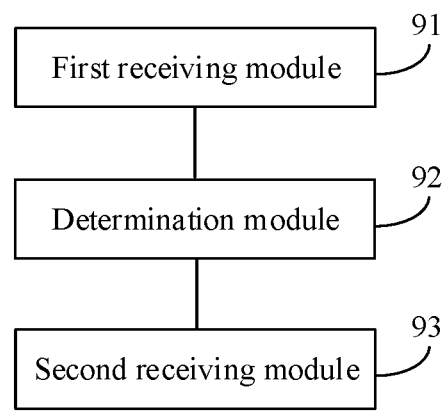
FIG. 9 is a block diagram of a device for receiving a paging message according to an exemplary embodiment.

FIG. 9 is a block diagram of a device for receiving a paging message according to an exemplary embodiment. The device may be arranged in UE. As shown in FIG. 9, the device may include a receiving module 91, a determination module 92 and a second receiving module 93.

The first receiving module 91 is configured to receive configuration information from a base station, the configuration information including multiple POs, an effective PO set in the multiple POs and related information for determining an effective PO corresponding to the UE.

When the configuration information is first configuration information, the effective set in the multiple POs may be a first effective PO set, and the related information for determining the effective PO corresponding to the UE may be an ID of UE and an ID of an effective PO corresponding to the UE in the first effective PO set. When the configuration information is second configuration information, the effective set in the multiple POs may be a second effective PO set, and the related information for determining the effective PO corresponding to the UE may be the ID of the UE and an ID of an effective PO corresponding to the UE in the second effective PO set. When the configuration information is third configuration information, the effective set in the multiple POs may be the first effective PO set, and the related information for determining the effective PO corresponding to the UE may be offset information.

The second configuration information may be contained in a system information updating message, and the third configuration information may be contained in RRC signaling.

The determination module 92 is configured to determine the effective PO according to the configuration information received by the first receiving module 91.

In the embodiment, when the configuration information includes the first configuration information, the ID of the effective PO corresponding to the UE may be determined according to the ID of the UE. When the configuration information includes the second configuration information, the ID of the effective PO corresponding to the UE may be determined according to the ID of the UE. When the configuration information includes the third configuration information, the offset information may be added to the effective PO ID in the first effective PO set to obtain the effective PO corresponding to the UE. For example, when the effective PO ID in the first effective PO set is 1 and the offset information is 2, the effective PO corresponding to the UE is PO3.

The second receiving module 93 is configured to receive a paging message through the effective PO determined by the determination module 92.

After the corresponding effective PO is determined, the paging message may be received through the effective PO.

According to the embodiment, the configuration information may be received, the effective PO may be determined according to the configuration information, and the paging message may be received through the effective PO. Since the effective PO configured for the UE in the configuration information is part of POs in the multiple POs, a paging overhead may be reduced, and power may also be saved.

Figure 10:
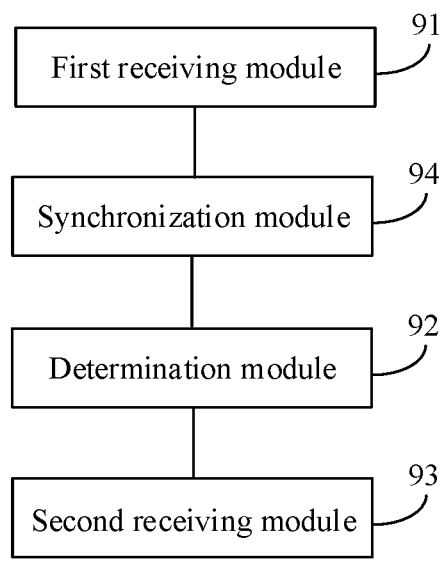
FIG. 10 is a block diagram of another device for receiving a paging message according to an exemplary embodiment.

FIG. 10 is a block diagram of another device for receiving a paging message according to an exemplary embodiment. In the embodiment, the second configuration information may further include a synchronous reference signal corresponding to each effective PO in a difference set between the second effective PO set and the first effective PO set. As shown in FIG. 10, based on the embodiment shown in FIG. 9, the device may further include a synchronization module 94.

The synchronization module 94 is configured to, before the determination module 92 determines the effective PO according to the configuration information, perform downlink synchronization according to the synchronous reference signal.

According to the embodiment, downlink synchronization may be performed according to the synchronous reference signal, so that the paging message may be correctly received.

Figure 11:
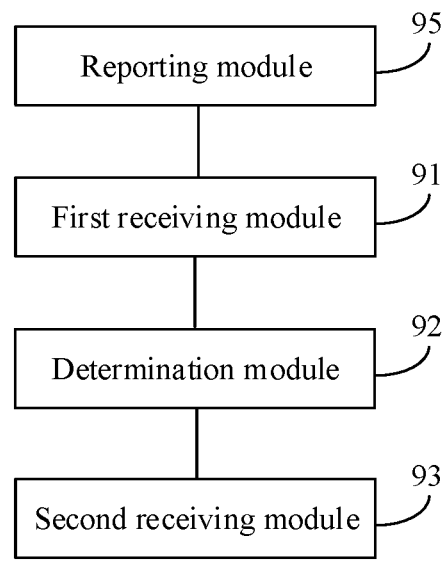
FIG. 11 is a block diagram of another device for receiving a paging message according to an exemplary embodiment.

FIG. 11 is a block diagram of another device for receiving a paging message according to an exemplary embodiment. As shown in FIG. 11, based on the embodiment shown in FIG. 9, the device may further include a reporting module 95.

The reporting module 95 is configured to report UE related information to the base station to enable the base station to group the UE according to the UE related information, the UE related information including at least one of type information, capability information and a service request of the UE.

According to the embodiment, the UE related information may be reported to a base station to provide a condition for the base station to group the UE according to the UE related information.

Figure 12:
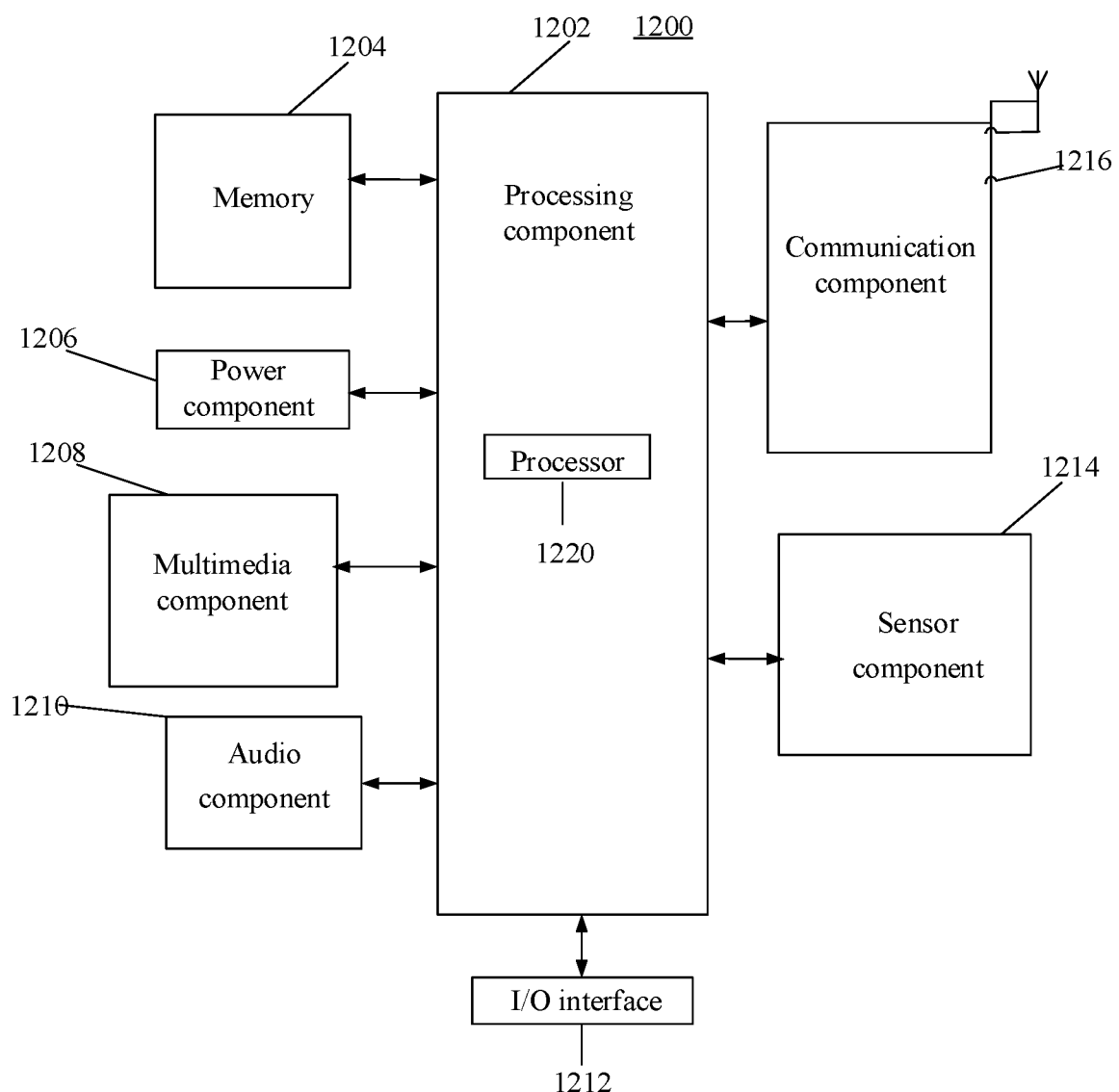
FIG. 12 is a block diagram of a device applied to paging message reception according to an exemplary embodiment.

FIG. 12 is a block diagram of a device applied to paging message reception according to an exemplary embodiment. For example, the device 1200 may be UE such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 is typically configured to control overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

One processor 1220 in the processing component 1202 may also be configured to:

receive configuration information from a base station, the configuration information including multiple POs, an effective PO set in the multiple POs and related information for determining an effective PO corresponding to UE;

determine the effective PO according to the configuration information; and receive a paging message through the effective PO.

The memory 1204 is configured to store various types of data to support the operation of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 may provide power for various components of the device 1200. The power component 1206 may include a power management system, one or more power supplies, and other components associated with generation, management and distribution of power for the device 1200.

The multimedia component 1208 may include a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 may provide an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 may include one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (WiFi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1204 including an instruction, and the instruction may be executed by the processor 1220 of the device 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 13:
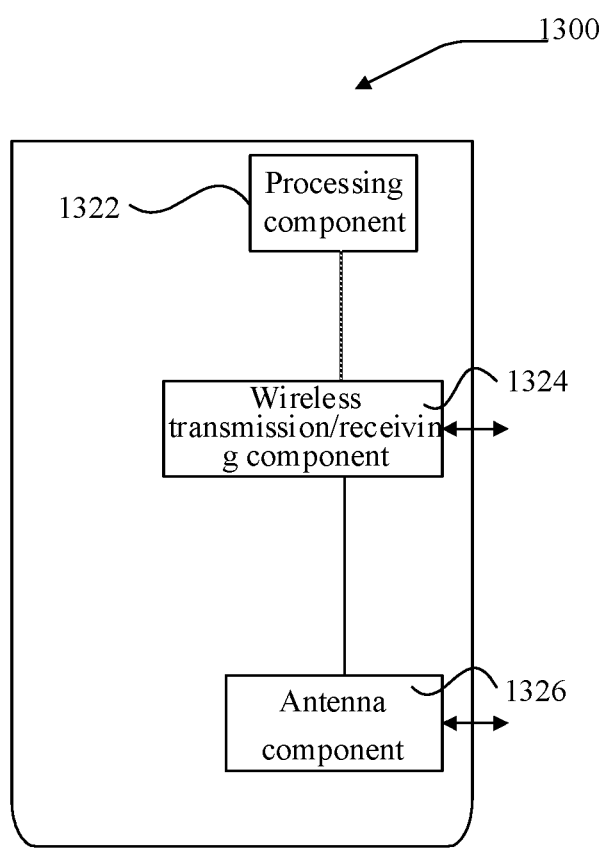
FIG. 13 is a block diagram of a device applied to paging configuration according to an exemplary embodiment.

FIG. 13 is a block diagram of a device applied to paging configuration according to an exemplary embodiment. The device 1300 may be provided as a base station. Referring to FIG. 13, the device 1300 includes a processing component 1322, a wireless transmission/receiving component 1324, an antenna component 1326 and a wireless interface-specific signal processing part, and the processing component 1322 may further include one or more processors.

One processor in the processing component 1322 may be configured to:

judge whether a present system load level of a present cell is greater than a preset load threshold or not; and in response to determining the present system load level is lower than or equal to the preset load threshold, send first configuration information to each UE in the present cell, the first configuration information including multiple POs, a first effective PO set in the multiple POs, an ID of UE and an ID of an effective PO corresponding to the UE in the first effective PO set.

In an exemplary embodiment, there is also provided a non-transitory computer-readable storage medium including an instruction, and the instruction may be executed by the processing component 1322 of the device 1300 to implement the paging configuration method. For example, the non-transitory computer-readable storage medium may be a ROM, a RAM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, namely, may be arranged in the same place or may be distributed to multiple network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the present disclosure are adopted only to distinguish one entity or operation from another entity or operation and not always to require or imply existence of any such practical relationship or sequence between the entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A paging configuration method, applied to a base station, the method comprising:

determining whether a present system load level of a present cell is greater than a preset load threshold; and in response to determining the present system load level is lower than or equal to the preset load threshold, sending first configuration information to each User Equipment (UE) in the present cell, wherein the first configuration information comprises: multiple Paging Occasions (POs), a first effective PO set in the multiple POs, an identifier (ID) of UE and an ID of an effective PO corresponding to the UE in the first effective PO set.

2. The method of claim 1, further comprising:

in response to determining the present system load level is greater than the preset load threshold, sending second configuration information to each UE in the present cell through a system information updating message, wherein the second configuration information comprises: the multiple POs, a second effective PO set in the multiple POs, the ID of the UE and an ID of an effective PO corresponding to the UE in the second effective PO set; the first effective PO set is a subset of the second effective PO set; or in response to determining the present system load level is greater than the preset load threshold, sending third configuration information to newly-added UE in the present cell through Radio Resource Control (RRC) signaling, wherein the third configuration information comprises the multiple POs, the first effective PO set, and offset information.

3. The method of claim 2, wherein the system information updating message comprises a newly-added field, and the newly-added field is configured to indicate the ID of the UE and the ID of the effective PO corresponding to the UE in the second effective PO set.

4. The method of claim 2, wherein the second configuration information further comprises synchronous reference signals corresponding to each effective PO in a difference set between the second effective PO set and the first effective PO set.

5. The method of claim 2, further comprising:
receiving UE related information from the UE, the UE related information comprising at least one of type information, capability information and a service request of the UE; and
grouping the UE according to the UE related information.

6. The method of claim 5, wherein sending the second configuration information to each UE in the present cell through the system information updating message comprises:
sending an effective PO in the first effective PO set to UE belonging to a first group in the present cell through a system information updating message; and
sending an effective PO in a difference set between the second effective PO set and the first effective PO set to UE belonging to a second group in the present cell through a system information updating message.

7. A communication system implementing the method of claim 1, comprising the base station, wherein the base station is configured to balance Synchronous Signal Block (SSB) distribution and reduce paging overhead based on the present load level being lower than or equal to the preset load threshold.

8. The communication system of claim 7, further comprising the UE, wherein the UE is configured to receive the configuration information, determine the effective PO according to the configuration information, and receive the paging message through the effective PO that is configured for the UE in the configuration information among the multiple POs, thereby reducing the paging overhead and saving power.

9. A method for receiving a paging message, applied to User Equipment (UE), the method comprising:
receiving configuration information from a base station, the configuration information comprising multiple Paging Occasions (POs), an effective PO set in the multiple POs and related information for determining an effective PO corresponding to the UE;
determining the effective PO according to the configuration information; and
receiving a paging message through the effective PO,
wherein when the configuration information is first configuration information, the effective set in the multiple POs is a first effective PO set, and the related information for determining the effective PO corresponding to the UE is an identifier (ID) of the UE and an ID of the effective PO corresponding to the UE in the first effective PO set; or
when the configuration information is second configuration information, the effective set in the multiple POs is a second effective PO set, and the related information for determining the effective PO corresponding to the UE is the ID of the UE and an ID of an effective PO corresponding to the UE in the second effective PO set; or
when the configuration information is third configuration information, the effective set in the multiple POs is the first effective PO set, and the related information for determining the effective PO corresponding to the UE is offset information.

10. The method of claim 9, wherein the second configuration information is contained in a system information updating message.

11. The method of claim 9, wherein the second configuration information further comprises a synchronous reference signal corresponding to each effective PO in a difference set between the second effective PO set and the first effective PO set;
the method further comprises:
performing, before determining the effective PO according to the configuration information, downlink synchronization according to the synchronous reference signal.

12. The method of claim 9, wherein the third configuration information is contained in Radio Resource Control (RRC) signaling.

13. The method of claim 9, further comprising:
reporting UE related information to the base station to enable the base station to group the UE according to the UE related information, the UE related information comprising at least one of type information, capability information and a service request of the UE.

14. A base station, comprising:
a processor; and
a memory configured to store an instruction executable by the processor,
wherein the processor is configured to:
determine whether a present system load level of a present cell is greater than a preset load threshold or not; and
in response to determining the present system load level is lower than or equal to the preset load threshold, send first configuration information to each User Equipment (UE) in the present cell, the first configuration information comprising multiple Paging Occasions (POs), a first effective PO set in the multiple POs, an identifier (ID) of UE and an ID of an effective PO corresponding to the UE in the first effective PO set.

15. The base station of claim 14, wherein the processor is further configured to:
in response to determining the present system load level is greater than the preset load threshold, send second configuration information to each UE in the present cell through a system information updating message, wherein the second configuration information comprises: the multiple POs, a second effective PO set in the multiple POs, the ID of the UE and an ID of an effective PO corresponding to the UE in the second effective PO set; the first effective PO set is a subset of the second effective PO set; or
in response to determining the present system load level is greater than the preset load threshold, send third configuration information to newly-added UE in the present cell through Radio Resource Control (RRC) signaling, wherein the third configuration information comprises the multiple POs, the first effective PO set, and offset information.

16. The base station of claim 15, wherein the system information updating message comprises a newly-added field, and the newly-added field is configured to indicate the ID of the UE and the ID of the effective PO corresponding to the UE in the second effective PO set.

17. The base station of claim 15, wherein the second configuration information further comprises a synchronous reference signal corresponding to each effective PO in a difference set between the second effective PO set and the first effective PO set.

18. The base station of claim 15, wherein the processor is further configured to:
- receive UE related information from the UE, the UE related information comprising at least one of type information, capability information and a service request of the UE; and
- group the UE according to the UE related information.

19. The base station of claim 18, wherein send the second configuration information to each UE in the present cell through the system information updating message comprises:
- send an effective PO in the first effective PO set to UE belonging to a first group in the present cell through a system information updating message; and
- send an effective PO in a difference set between the second effective PO set and the first effective PO set to UE belonging to a second group in the present cell through a system information updating message.

* * * * *